3,517,027
INDOLINE PHOSPHATES USEFUL AS
INSECTICIDES
Theodore Largman, Morristown, and Peter E. Newallis,
Overland Park, N.J., assignors to Allied Chemical Corporation, New York, N.Y., a corporation of New York
No Drawing. Filed Jan. 16, 1968, Ser. No. 698,114
Int. Cl. C07d 27/38
U.S. Cl. 260—326.11     9 Claims

ABSTRACT OF THE DISCLOSURE

A new class of indoline phosphates and phosphonates which are useful as insecticides having the following formula:

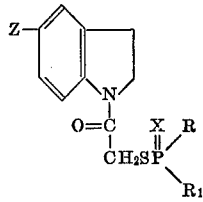

wherein X represents oxygen or sulfur; R represents an alkoxy group having 1–5 carbon atoms; $R_1$ represents a lower alkyl or alkoxyl group having 1–5 carbon atoms; and Z represents F, Cl, Br, I, $NO_2$, $CH_3CO$, CN or H.

The above compounds are prepared by reacting ammonium salts of phosphoric acid esters with N-chloroacetylindolines.

BACKGROUND OF THE INVENTION

This invention relates to a new class of phosphates and phosphonates and in particular to a new class of indoline phosphates and phosphonates useful as insecticides, acaricides, and nematocides.

The requirement for useful insecticides and acaricides, vary depending upon the kind of application intended. To be successful, an insecticide and acaricide must be toxic to the insect or acarid to be controlled. For some applications, it is desirable that the insecticide and acaricide be stable and have extended residual activity; for other applications, it is desirable that its useful life be short. For use by unskilled personnel, it should be relatively non-toxic to mammals; in other uses, particularly where it is to be applied by skilled personnel only, the mammalian toxicity is less of a factor. Of course, where the insecticide and acaricide is to be applied to the foliage or roots of plants, or soil in which the plant is growing it must be nonphytotoxic, at least at the insecticidal and acaricidal dosage.

It is an object of this invention to provide a new class of indoline phosphates and phosphonates.

It is another object of this invention to provide a new class of indoline phosphates and phosphonates useful as insecticides, acaricides, and nematocides.

It is an additional object of the present invention to provide a process for producing a new class of indoline phosphates and phosphonates useful as insecticides, acaricides, and nematocides.

SUMMARY OF THE INVENTION

The following general structure represents the compounds of the invention:

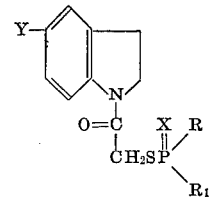

wherein X represents oxygen or sulfur; R represents an alkoxyl group having 1–5 carbon atoms; $R_1$ represents an alkoxyl or alkyl group having 1–5 carbon atoms; and Z represents F, CL, Br, I, $NO_2$, $CH_3$—CO, CN or H.

These compounds are solids which are soluble in many organic solvents but are essentially insoluble in water. They have good acaricidal activity. Accordingly, they can be used safely and very effectively for combatting eggs and active stages of spider mites in the protection of plants. Furthermore, these compounds can be used to control nematodes. Moreover, these compounds can also be used as active toxicants in compositions for the control of a number of insect organisms such as flies, beetles, worms, roaches, cattle grubs, and aphids. The toxic potency of this class of compounds is such so as to permit their effective use as dilute solution in sprays, and oils.

DESCRIPTION OF THE PREFERRED EMBODIMENT

The synthesis of the compounds of the present invention may be carried out by reacting a N-chloractylindoline with the ammonium salt of an ester of phosphoric acid, as illustrated by the following general equation:

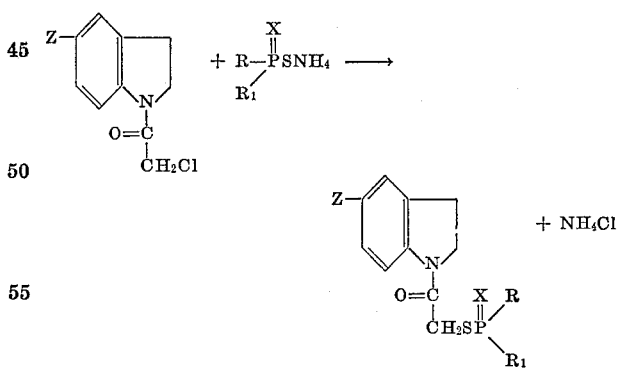

where Z, X, R, $R_1$ have the same significance as indicated above. The reaction may be carried out in any common inert organic solvent such as acetone, benzene, dimethylformamide or carbon tetrachloride. Approximate stoichiometric amounts of the reactants are used. The indoline is first dissolved in the solvent and then the ammonium salt is added whereupon the reaction mixture is stirred generally at 30–100° C., preferably at 40–60° C., for generally 1–6 hours and preferably 2–4 hours. The reaction is carried out at atmospheric pressure although higher pressures may be used. After the completion of the reaction, the reaction mixture is filtered and the solvent is removed under reduced pressure. The residue is taken up in a water immiscible organic solvent, such as methylene chloride, and washed several times with water. The organic layer is then dried over a drying agent, such as anhydrous magnesium sulfate and filtered. The organic solvent is removed from the filtrate under reduced pressure thereby providing a residue product. The residue product may be purified by recrystallizing it from a solvent system such as an ethanol-hexane solvent.

Preparation of a typical compound of the present invention is described in the following example. The example is intended to be illustrative and exemplary in character only and is not intended to be considered as limiting the invention in any way. The reaction conditions can also be modified without departing from the spirit of the invention.

EXAMPLE I

Five grams of N-chloroacetylindoline was dissolved in 50 cc. of acetone. To this solution was added 4.6 grams of $$\text{NH}_4\text{S}\overset{\text{S}}{\underset{\|}{\text{P}}}(\text{OCH}_3)_2$$

(ammonium o,o-dimethyl phosphorodithioate). The mixture was warmed to 50° C. and stirred for two hours. After filtration, the acetone was removed with a rotary evaporator. The residue was then taken up in methylene chloride washed with water and the methylene chloride layer dried over magnesium sulfate. The methylene chloride solution was filtered, the filtrate then being subjected to reduced pressure to remove the methylene chloride by distillation under reduced pressure. The residue product was purified by recrystallization from an ethanol-hexane mixture. The purified residue product (8.0 grams) had a melting point of 74–75° C. and is shown as Compound 1 in Table I below.

Table I sets forth typical examples of compounds of the present invention which were prepared in the same manner as the process described in Example I.

TABLE I

| Compound No. | Compound | Calculated | Found |
|---|---|---|---|
| 1 | 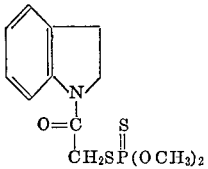 | C=45.3; H=5.04; S=20.01. | C=45.8; H=5.3; S=20.0. |
| 2 | 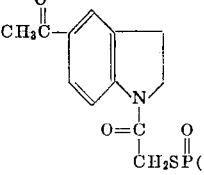 | N=3.77 | N=4.5. |
| 3 | 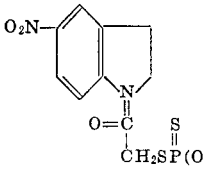 | C=43.1; H=4.88 | C=43.2; H=5.32. |
| 4 | 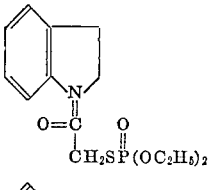 | C=50.8; H=6.06; S=9.7. | C=51.0; H=6.28; S=9.65. |
| 5 | 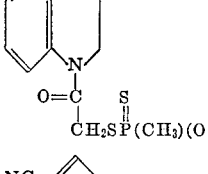 | | |
| 6 | 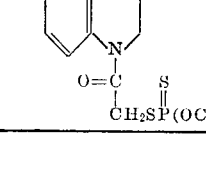 | | |

In using the compound of this invention as insecticides and acaricides the undesirable organism may be killed by contacting the organism directly, by contacting the organism through its habitat, or by contacting the organism through its food prior and after ingestion with toxic amounts of the compounds.

Standardized tests were conducted to determine the effectiveness as insecticides and acaricides of the compounds listed in Table I against adult house flies, two-spider mites, southern army larvae, pea aphid adults, and Mexican bean beetle larvae.

The following tests were performed to determine the effectiveness of the compounds of Table I in controlling insects and acarids. The results of the tests are listed in Table II.

TEST I

Non-systemic primary test for mexican bean beetle larvae (MBBL)

A solution consisting of 4.8 gm. of Compound 5 was mixed in 100 cc. of acetone. The solution was diluted with water so that the concentration of Compound 5 was 4 oz./100 gal.

Horticultural (cranberry) bean plants, in 2½ inch pots with all foliage removed except one primary leaf, were sprayed with the solution for two seconds on the upper surface and five seconds on the under surface. The spray was delivered from a DeVilbiss atomizer nozzle at 20 p.s.i. The approximate volume of spray on the upper surface was 0.19 cc. and the under surface was 0.48 cc. After spraying, the deposits were allowed to dry on the plants and 5 3rd instar larvae were then confined on each plant with 6 inch screen wire spheres. Mortality and feeding records were made 3 days after treatment.

TEST II

Non-systemic test for pea aphid adults (PAA)

A solution consisting of 4.8 grams of Compound 5 was mixed in 100 cc. of acetone. The solution was diluted with water so that the concentration of Compound 5 was 4 oz./100 gal.

English broad bean plants were sprayed for two seconds on upper surface and five seconds on under surface with this solution. Adult female aphids (10 per test) were brushed from infested broad bean plants into five inch screen wire hemispheres and sprayed for five seconds (approx. 0.6 cc. delivery per second from nozzle). Spray was applied from a DeVilbiss atomizer nozle at 20 p.s.i., with the aphids 15 inches from the nozzle. Following treatment, aphids were caged over previously sprayed plants and mortality records were made 3 days later.

TEST III

Non-systemic primary test for southern armyworm larvae (SAL)

A solution consisting of 4.8 grams of Compound 5 was mixed in 100 cc. of acetone. The solution was diluted with water so that the concentration of Compound 5 was 4 oz./100 gal.

Horticultural (cranberry) bean plants, in 2½ inch pots with all foliage removed except one primary leaf, were sprayed with the solution for two seconds on the upper surface and five seconds on the under surface. The spray was delivered from a DeVilbiss atomizer nozzle at 20 p.s.i. The approximate volume of spray on the upper surface was 0.19 cc. and the under surface was 0.48 cc. After spraying, the deposits were allowed to dry on the plants and 5 4th and 5th instar larvae were then confined on each plant with 6 inch screen wire spheres. Mortality and feeding records were made 3 days after treatment.

TEST IV

Non-systemic primary test for two-spotted spider mites (TSSM)

A solution was prepared of 4.8 gm. of Compound 5 is 100 cc. of acetone. The solution was diluted with water to a concentration of 4 oz./100 gal. of Compound 5.

Young horticultural (cranberry) bean plants in 2½ inch pots were infested with mites (all stages) one day before treatment. In treating plants the upper surface was sprayed with the solution for two seconds and the lower or under surface was sprayed for 5 seconds. The spray was delivered from a DeVilbiss atomizer nozzle operated at 20 p.s.i. with the plant about 18″ from the nozzle. The approximate volume of spray on the upper surface was 0.13 cc. and on the lower surface was 0.32 cc. Following the treatment, the potted plants were placed in irrigated trays in the greenhouse and initial kills of adults were recorded 3 days later. Residual and ovicidal observations were made 7–8 days after treatment, which allowed ample time for the eggs to hatch under greenhouse conditions. One leaf from each plant was used to make 3-day counts, and the remaining leaf on each plant was used to determine residual and ovicidal activity.

TEST V

Non-systemic primary test for house fly adults (HFA)

Dry food (6 parts powdered non-fat dry milk, 6 parts granulated sugar and 1 part powdered egg) was mixed with an acetone solution of Compound 5 so that the food contained 0.125% of the compound. The mixture was allowed to dry and then repulverized. Wettable powders were mixed with the dry food with the aid of mortar and pestle. The treated food was placed in emergence cages containing 50 fly pupae. Cages containing untreated food were used as checks. Examination of each cage was made periodically for 8 days to determine emergence, condition of flies, and acute toxicity.

Similar tests were performed for Compounds 1, 2, 3 and 4, the results of which are also disclosed with Compound 5 in Table II.

TABLE II.—RESULTS OF NONSYSTEMIC PRIMARY TESTS
[Percent morality]

| Compound No. | MBBL, Test I | PAA, Test II | SAL, Test III | TSSM, Test IV | HFA, Test V |
|---|---|---|---|---|---|
| 1 | 100 | 0 | 100 | 12 | |
| 2 | 80 | 0 | 0 | 45 | |
| 3 [1] | 100 | 70 | 0 | 0 | [2] 100 |
| 4 | 80 | 0 | 100 | 5 | |
| 5 | 75 | 0 | 100 | 8 | [3] 100 |

[1] Test conducted at dilution of 4 lbs./100 gal. H₂O.
[2] 1.0% dry bait, 7-day kill.
[3] 0.125% dry bait, percent 8-day kill.

Compounds 1, 2, 4, and 5 were then put through systemic tests. The systemic primary tests were conducted for Mexican bean bettle larvae (MBBL), pea aphid adults (PAA), southern armyworm larvae (SAL) and two-spotted spider mites (TSSM).

TEST VI

Systemic primary test for Mexican bean bettle larvae (MBBL)

A standard acetone solution containing 4.8 grams of Compound 5 per 100 cc. of acetone was diluted with water to 4 oz./100 gals. of H₂O. After dilution, 100 cc. of the solution were placed in glass jars, along with the test plants (young horticultural (cranberry) bean plants) whose roots had been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

TEST VII

Systemic primary test for pea aphid adults (PAA)

A standard acetone solution containing 4.8 grams of Compound 5 per 100 cc. of acetone was diluted with water to 4 oz./100 gals. H₂O. After dilution, 100 cc. of the solution were placed in glass jars, along with the test plants (young English broad bean plants) whose roots were washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

TEST VIII

Systemic primary test for southern armyworm larvae (SAL)

A standard acetone solution containing 4.8 grams of Compound 5 per 100 cc. of acetone was diluted with water to 4 oz./100 gal. of H₂O. After dilution, 100 cc. of the solution were placed in glass jars, along with the test plants (young horticultural (cranberry) bean plants) whose roots had been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

TEST IX

Systemic primary test for two-spotted spider Mites (TSSM)

A standard acetone solution containing 4.8 grams of Compound 5 per 100 cc. of acetone was diluted with water to 4 oz./100 gals. of H₂0. After dilution, 100 cc. of the solution were placed in glass jars, along with the test plants (young horticultural (cranberry) bean plants) whose roots have been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later. The ovicidal and residual data was recorded 8 days after the treatment.

The results of Tests VI–IX for Compounds 1, 2, 4, and 5 are listed in Table III.

TABLE III.—RESULTS OF SYSTEMIC PRIMARY TESTS
[Percent mortality used in dil. of 4 oz./100 gals. H₂O]

| Compound No. | Test VI, MBBL | Test VII, PAA | Test VIII, SAL | Test IX, TSSM |
|---|---|---|---|---|
| 1 | 0 | 100 | 0 | 3.2 |
| 2 | 0 | ¹100 | 40 | 0 |
| 4 | 0 | ¹100 | 0 | 11.1 |
| 5 | 0 | ¹100 | 0 | 8.5 |

¹ No surviving young on plant.

In the systemic primary tests, it is noted that, while the compounds of the invention were not very effective against the Mexican bean beetle larvae, and the two-spotted spider mite, they were very effective against the pea aphid adults.

What is claimed is:
1. A compound of the formula:

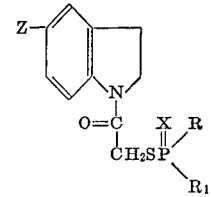

wherein:
X represents oxygen or sulfur;
R represents an alkoxyl group having 1-5 carbon atoms;
R₁ represents an alkoxyl or alkyl group having 1-5 carbon atoms; and
Z represents NO₂, CH₃CO, CN or H.

2. A compound of the formula of claim 1 in which X represents oxygen, R represents an ethoxy group, and R₁ represents an ethoxy group.

3. A compound of the formula of claim 1 in which X represents sulfur, R represents an ethoxy group, and R₁ represents an ethoxy group.

4. A compound of the formula of claim 1 in which X represents sulfur, R represents a methoxy group, and R₁ represents a methoxy group.

5. A compound of the formula of claim 1 in which X represents sulfur, R represents an ethoxy group, and R₁ represents a methyl group.

6. A compound of claim 1 having the formula:

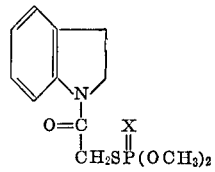

wherein X represents oxygen or sulfur.

7. A compound of claim 1 having the formula:

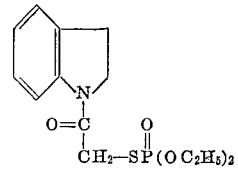

8. A compound of claim 1 having the formula:

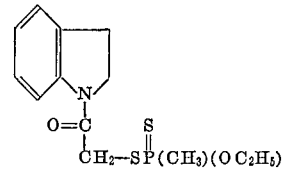

9. A compound of claim 1 having the formula:

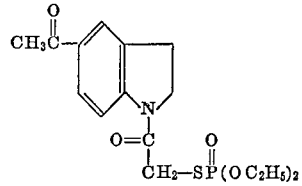

References Cited

UNITED STATES PATENTS 3,420,918  1/1969  Fancher et al. _____ 260—938
3,232,987  2/1966  Lutz et al. _____ 260—561

ALEX MAZEL, Primary Examiner

J. A. NARCAVAGE, Assistant Examiner

U.S. Cl. X.R.
424—200